No. 896,812. PATENTED AUG. 25, 1908.
T. A. EDISON.
STORAGE BATTERY.
APPLICATION FILED MAR. 18, 1908.
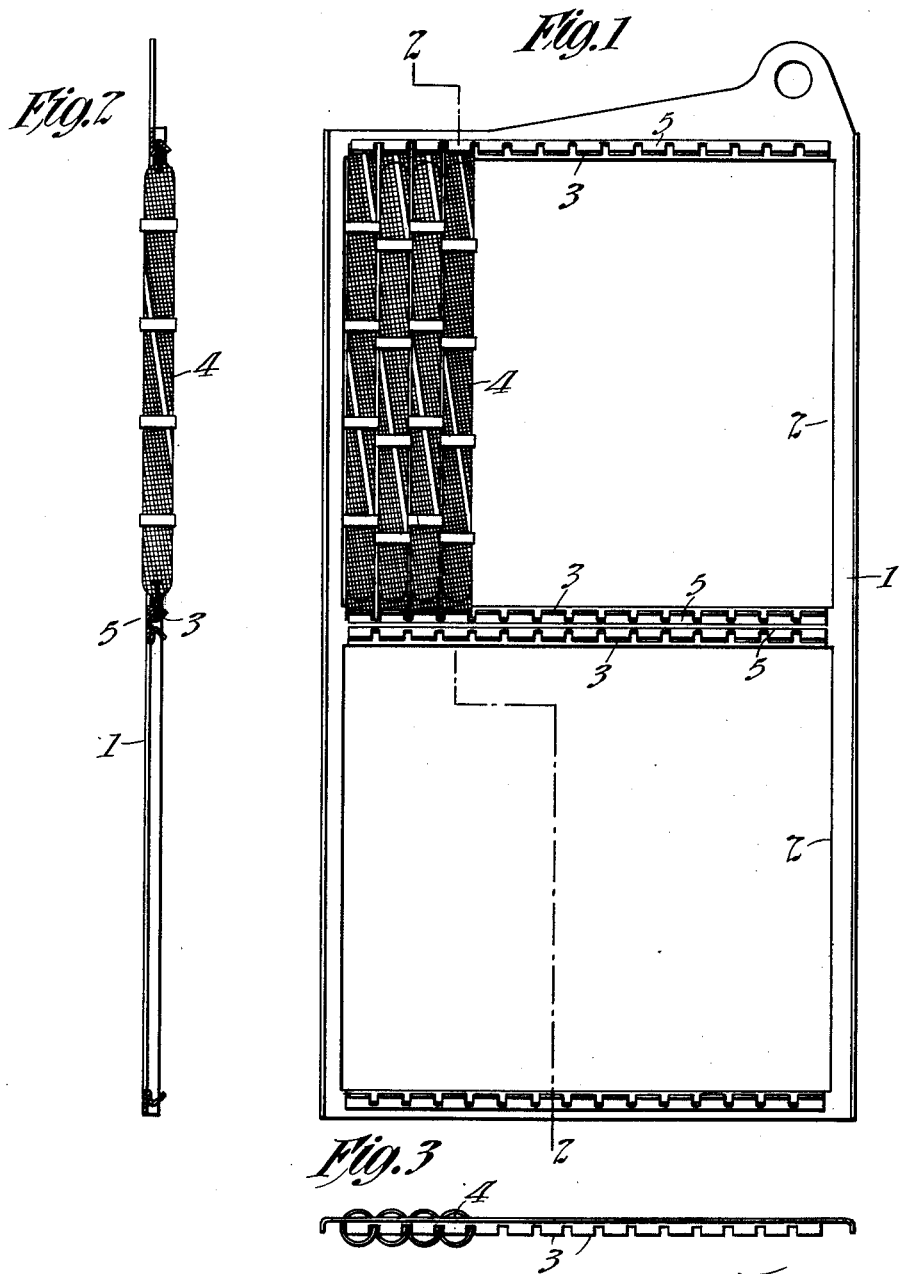
Witnesses:
Frank D. Lewis
Hsbert H. Dyke
Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

No. 896,812.  Specification of Letters Patent.  Patented Aug. 25, 1908.

Application filed March 18, 1908. Serial No. 421,889.

*To all whom it may concern:*

Be it known that I, THOMAS A. EDISON, a citizen of the United States, and a resident of Llewellyn Park, Orange, county of Essex, and State of New Jersey, have invented certain new and useful Improvements in Storage Batteries, of which the following is a description.

My invention relates to storage batteries of the type in which a plurality of pockets containing the active material are secured to a conducting plate or grid, and has for its object the provision of improved means for securing such pockets to said grid, said means permitting the ready removal of any of said pockets from the grid without moving or disturbing any of the other pockets, whereby a defective pocket can be removed from the grid at any time and replaced by a new pocket, with the least possible effort.

Reference is hereby made to the accompanying drawing, of which

Figure 1 is a side elevation of my improved storage battery grid, to which four pockets are secured; Fig. 2, is a section of the same on line 2—2 of Fig. 1; and Fig. 3, is a plan.

The grid shown consists of a plate 1, of thin sheet metal, such as nickel-plated steel, stamped to form one or more openings 2 of rectangular form, the upper and lower edges of the same being formed with flanges 5 having integral tongues 3 situated in vertical alinement with each other, and corresponding in number to the number of pockets 4, which are to be applied to the said opening. The pockets shown are in the form of tubes of perforated metal filled with active material, the ends of said tubes being compressed or flattened as shown, and the flanges 5 in which the tongues 3 are formed, are bent away from the opening 2, as shown in Fig. 2. When the tongues 3 are at right angles to the flanges 5, the pockets 4 may be placed in position, and the tongues 3 are then bent toward the flanges 5 into the position shown in Fig. 2, thereby firmly securing the flattened ends of the tubular pockets 4 and holding the same in conductive relation to the plate 1. Obviously, any one of the pockets 4 may be removed from the grid by bending the upper and lower securing tongues which hold the same, and a new pocket substituted therefor, the tongues being then bent back into holding position without disturbing any of the other pockets which are carried by the grid. The flanges 5 may be dispensed with by forming the entire edge of the opening 2 with alternate wide and narrow tongues, and bending out the narrow tongues to engage the central part of the flattened ends of the pockets and clamp the same against the two adjacent wide tongues.

Having now described my invention, what I claim is:—

1. In a storage battery, a supporting plate, a plurality of tongues carried thereby and pockets secured by said tongues, said tongues being capable of being bent into such position as to permit the pockets to be separately removed from the said plate, substantially as set forth.

2. In a storage battery, the combination of a plate having a plurality of integral tongues and pockets secured by said tongues, said tongues being capable of being bent into such position as to permit the pockets to be separately removed from said plate, substantially as set forth.

3. In a storage battery, the combination of a plate, a plurality of flexible tongues carried thereby, and elongated pockets, the ends of which are secured by said tongues, said tongues being capable of being bent to permit the separate removal of said pockets, substantially as set forth.

4. In a storage battery, a plate formed with an opening, integral flanges along the opposite edges of said opening and tongues formed in said flanges and capable of being bent to secure a plurality of pockets to said plate, substantially as set forth.

5. In a storage battery, a plate formed with a rectangular opening, the opposite edges of which are formed with flexible tongues for separately securing pockets to said plate, substantially as set forth.

6. In a storage battery, a plate formed with a rectangular opening, upper and lower flanges bent away from said opening, and a plurality of flexible tongues formed in the edges of said flanges, substantially as set forth.

7. In a storage battery, the combination of a plate having a rectangular opening, a series of vertical tubular pockets applied to said opening, and flexible tongues integral with said plate and engaging the ends of said pockets for securing the same, substantially as set forth.

This specification signed and witnessed this 13th day of March 1908.

THOS. A. EDISON.

Witnesses:
FRANK L. DYER,
ANNA R. KLEHM.